3,539,615
PREPARATION OF CYANOCYCLOBUTANE BY THE CYCLOADDITION OF ETHYLENE AND ACRYLONITRILE
Donald E. Plorde, Wilmington, Del., assignor to E. I. du Pont de Nemours and Company, Wilmington, Del., a corporation of Delaware
No Drawing. Filed Sept. 27, 1968, Ser. No. 763,346
Int. Cl. C07c *121/46*
U.S. Cl. 260—464           8 Claims

ABSTRACT OF THE DISCLOSURE

Described and claimed is the process for preparing cyanocyclobutane by the cycloaddition of ethylene and acrylonitrile at 200–350° C., 500–5,000 atm. pressure and, preferably, in the presence of a polymerization inhibitor such as 1-dodecanethiol.

BACKGROUND OF THE INVENTION

Field of the invention

This application relates to, and has as its principal object provision of, a process for the cycloaddition of ethylene to acrylonitrile to give a substituted cyclobutane.

Description of the prior art

Heretofore, the cycloadditions of ethylene and tetrafluoroethylene and of allenes and ketenes with activated alkenes and alkynes have been disclosed. Thus, Coffman et al. (J. Am. Chem. Soc. 71, 490 (1949)) have reported a variety of cycloadditions including that of ethylene with tetrafluoroethylene.

More recently, in a review of thermal cycloadditions J. D. Roberts (Organic Reactions, vol. 12, p. 18, John Wiley, New York (1962)) has pointed out that cycloaddition reactions involving two different reactants "occur more or less well with the following combinations.

"Fluoro- and fluorochloro-alkenes having a gemfluoro-substituted double bond with activated alkenes and alkynes, 1,3-dienes and alkenes, and with ordinary alkenes. For the last group successful results have been reported so far *only* with tetrafluoroethylene.

"Allenes with activated alkenes and alkynes.

"Ketenes with some activated alkenes, alkynes and 1,3-dienes." [Emphasis added.]

Ethylene and butadiene have also been reported to undergo cycloaddition in the Diels-Alder sense to yield cyclohexene (Joshel and Butz, J. Am. Chem. Soc. 63, 3350 (1941); G. M. Whitman, U.S. Pat. 2,662,102).

SUMMARY AND DETAILS OF THE INVENTION

Consideration of art such as that mentioned above leads to the conclusion that ethylene undergoes cycloaddition only with tetrafluoroethylene. It has now surprisingly been found that, under selected conditions, ethylene and acrylonitrile react to give the cycloaddition product, cyanocyclobutane, according to the following equation:

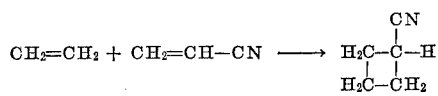

It is known that acrylonitrile forms cyclodimers, mixed cis- and trans-1,2-dicyanocyclobutane, according to the equation:

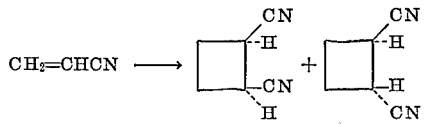

This reaction, described by E. C. Coyner and W. S. Hillman, Jr. (J. Am. Chem. Soc. 71, 324 (1949)), is competitive with the reaction of the invention and must be minimized by choice of reaction conditions. The desired reaction of the invention is favored by a large excess of ethylene and by high pressure.

The process is carried out in a suitable inert vessel by heating an admixture of ethylene and acrylonitrile under the process conditions of the following table:

| | Broadly operable | Preferred | Most preferred |
|---|---|---|---|
| Temperature, ° C | 200–350 | 250–350 | 300–350 |
| Pressure, atm | [1] 500–5,000 | 500–3,000 | 1,000–3,000 |
| Time, hours | 1/60–8 | 1/6–1 | 1/6–1/4 |
| Ethylene/acrylonitrile (mole ratio) | 1:1–100:1 | 4:1–30:1 | 14:1–30:1 |

[1] Or higher.

High temperatures and high pressures are desirable for the formation of cyanocyclobutane for two reasons: both provide higher rates of cycloaddition and higher pressure favors formation of one molecule (cyanocyclobutane) from two molecules (ethylene and acrylonitrile). Control Examples E and F, below, show the formation of small to trace amounts of cyanocyclobutane as the temperature is decreased below the preferred range while the pressure is maintained in the preferred range. Control Examples A, B, C and D show that no more than trace to small amounts of the product are obtained when one or both of the temperature and pressure are at or below the lower limits given.

High pressure tends to favor cycloaddition of ethylene/acrylonitrile below ca. 250° C. because ethylene is a gas under these condition (critical temperature=9.7° C.) whereas acrylonitrile remains predominantly liquid (critical temperature estimated 246° C.). Above ca. 250° C., high pressures would tend to favor both cyclodimerization of acrylonitrile and cycloaddition of ethylene/acrylonitrile since both reactants would be in the vapor phase. However, this situation allows the adjustment to high acrylonitrile ratios to direct the reaction dramatically to the formation of cyanocyclobutane.

The critical effect of reactant ratio, ethylene/acrylonitrile, is well illustrated by Examples 1, 2 and 3; the high relative concentrations of ethylene give little or no dicyanocyclobutanes. Without high ethylene/acrylonitrile ratios, high pressures can favor dicyanocyclobutane formation, as shown by Example 5 and E. The remarkable and critical effect of high ethylene concentration is to direct the reaction toward heteroaddition, rather than homoaddition, and this effect is augmented by the fact that ethylene does not form cyclobutane under preferred conditions.

Ethylene is known to undergo thermal polymerization at temperatures above about 200° C. (U.S. Pat. 2,153,-553). As pointed out by Roberts (op. cit., p. 30), it has been common practice to employ a polymerization inhibitor in cyclo-addition, possibly from the original naive view that only the polymerization was a free radical reaction and that, therefore, the inclusion of a polymerization inhibitor was necessary. Any of a wide variety of thiols, phenols, terpenes, metals, salts and sulfur can be used for this purpose. The useful inhibitors may include any of the thiols such as methanethiol, ethanethiol, 1- and 2-propane-thiols, 1- and 2-butanethiols, 2-methyl-2-butanethiol, hexanethiol, decanethiol, dodecanethiol, 11-mercaptohexadecene, cyclohexanethiol, thiophenol, o-, m- and p-thiocresol, thioxylenols, octadecanethiol, benzyl mercaptan, β-phenethyl mercaptan and 2-ethylhexanethiol, terpene-B, α- and β-pinene and limonene.

Metals, e.g., as fine powders or in thin wire form, are convenient inhibitors; included are silver, copper, and iron. Finely spun copper wool is particularly effective. The most suitable salts are copper salts, e.g., copper sulfate, copper acetate, cupric chloride and copper resinate. Phenol is operable, but superior phenolic inhibitors are hydroquinone p-methoxyphenol, the xylenols, t-butylcatechol, 2,5-dihydroxy-1, 4-benzoquinone, 1,4-naphthoquinone, 9,10-phenanthroquinone and 4-amino-1-naphthol. Miscellaneous inhibitors include, dodecyl disulfide; didodecyl disulfide, picric acid, m-dinitrobenzene, chloranil and sulfur.

A solvent or inert diluent is not necessary but may be desirable, especially for large scale reactions. Suitable solvents include acetonitrile, propionitrile, ether, benzene and tetrahydrofuran. A small amount of water (generally 1 to 10%, based on weight of acrylonitrile) in the reaction mixture is also desirable, although its role is unknown.

The cycloaddition can be carried out either batchwise or continuously. In either case, some form of agitation is essential to insure adequate contact between the reactants, acrylonitrile being normally liquid, ethylene, gaseous, under the reaction conditions. Stirred autoclaves or tubular reactors may be used in continuous operations, the reactants being pumped into the reactors under pressure and the reaction mixture discharged continuously. Agitation in the tubular reactor is obtained by turbulent flow of the reactants.

EMBODIMENTS OF THE INVENTION

There follow some nonlimiting examples illustrative of the invention in more detail.

Example 1.—To a 400-ml. stainless steel shaker tube was added about 60 mg. of 1-dodecanethiol (about 0.7% by weight of acrylonitrile used). The tube was closed and freed of air by alternating evacuation with nitrogen flushes (five cycles ending with evacuation). Ethylene containing less than 50 p.p.m. of oxygen was introduced in a stepwise manner while the tube was heated, with agitation, until 850 atm. of ethylene at 250° C. was reached. Oxygen- and inhibitor-free acrylonitrile (99.9+% pure) was injected by use of a calibrated piston-driven injector. Portions of 1.33 cc. of acrylonitrile were injected at 2-hour intervals. The total pressure was brought up to 1000 atm. with ethylene after each acrylontrile addition. A total of eight injections were made (10.6 cc., 0.16 mole of acrylonitrile). The molar ratio of ethylene to acrylonitrile was about 30:1. The last injection was followed by a 2-hour reaction period at 250° C. and 1000 atm.

After the last injection, the tube was cooled and ethylene slowly bled off until atmospheric pressure was reached. The tube was opened and the contents rinsed therefrom with acetonitrile. A small amount of white solid present was removed by filtration. Gas chromatographic analysis showed only the presence of unreacted acrylonitrile, acetonitrile rinse, and cyanocyclobutane identified by a comparison of its retention time with that of a genuine sample. Quantitative gas chromatography (using an internal standard) indicated that 11% of the acrylonitrile was converted to cyanocyclobutane. Time-of-flight mass spectrometry gave the same cracking pattern for the product as to authentic cyanocyclobutane. The product isolated by fractional distillation was spectrally (infrared and proton magnetic resonance) identical with genuine cyanocyclobutane.

Example 2.—A 20-g. sample of oxygen-free acrylonitrile was sucked into an evacuated 80-cc. stainless steel shaker tube (prepared as in Example 1) and ethylene added to give a pressure of 1000 atm. at 225° C. The molar ratio of ethylene to acrylonitrile was 2:1. Reaction was carried out under these conditions for 16 hours. When the tube was discharged as before, a 3% conversion to cyanocyclobutane based on acrylonitrile was found. In addition, a conversion to mixed cis- and trans-1,2-dicyanocyclobutane of 8% was found (by gas chromatographic analysis).

Example 3.—The process of Example 2 was repeated except that the molar ratio of ethylene to acrylonitrile was 14:1. The conversion to cyanocyclobutane was 4% while that of mixed cis- and trans-1,2-dicyanocyclobutanes was 2%.

Example 4.—A 200-ml. stainless steel shaker tube containing about 60 mg. of 1-dodecanethiol was freed of air as in Example 1, and 50 cc. of oxygen-free, reagent grade, anhydrous acetonitrile (air displaced by argon) was sucked into the tube. The tube was agitated, ethylene added to a pressure of 2400 atm. at 250° C. Two injections each of two milliliter portions of acrylonitrile were made into the tube at 4-hour intervals, followed by sufficient ethylene to increase the pressure by 50 atm. The molar ratio of ethylene to acrylonitrile was at least 4:1. The total time of reaction was 8 hours. The conversion to cyanocyclobutane was 5% and, to dicyanocyclobutane, 8%. In addition, 2–3 g. of red-orange polymer was also produced.

Example 5.—A shaker tube was charged with 60 mg. of dodecanethiol and 50 ml. of oxygen-free acetonitrile. The tube and contents were shaken and heated to 250° C. and ethylene added to give a pressure of 2400 atm. At 4-hour intervals, 2.0 ml. portions of acrylonitrile were injected, over a period of 8 hours. The mixture was heated with shaking at 250° C. for an additional 4 hours. Analysis showed 7.9% conversion of acrylonitrile to cyanocyclobutane. By-product, cis- and trans-1,2-dicyanocyclobutane, is formed to the extent of 10% based on the acrylonitrile used.

Example 6.—To a 400-ml. stainless steel tube was charged 150 mmoles of acrylonitrile and 0.1 g. of p-methoxyphenol. The tube was sealed, cooled in Dry Ice-acetone, and evacuated and flushed four times with nitrogen. Ethylene was added to approximately 150 atmospheres and the tube heated to 300° C., and additional ethylene added to 1000 atmospheres. The tube was then shaken for 1 hour. After cooling to room temperature, the tube was cooled in Dry Ice-acetone, and the excess ethylene vented slowly. There was obtained 16 g. of crude product containing a moderate amount of polymer. A known amount of tetramethylene sulfone was added as an internal standard and an aliquot of the resulting solution was analyzed by gas-liquid chromatography. Conversion to cyanocyclobutane=14%. Yield=75% of the theoretical.

Example 7.—To a 400-ml. stainless steel tube was charged 150 mmoles of acrylonitrile, 5 ml. of water, and 0.2 g. of p-methoxyphenol. The reaction was then carried out as described in Example 6 for 0.5 hour. The crude product (14.3 g.) was flash distilled to separate the water, acrylonitrile, and cyanocyclobutane from the polymer. There was obtained 6.0 g. of polymer and 3.78 g. of liquid organic product, containing cyanocyclobutane corresponding to a 22.8% conversion (58.5% yield).

Example 8.—To a 400-ml. stainless steel tube was charged 150 mmoles of acrylonitrile, 2 ml. of water and 0.3 g. of 2,6-di-t-butyl-p-cresol. The reaction was then carried out at 325° C. as described in Example 6 for 15 minutes. The crude product (17 g.) was flash distilled to separate the water, acrylonitrile and cyanocyclobutane from the polymer. There was obtained 11.4 g. of polymer and 3.45 g. of liquid organic product containing cyanocyclobutane corresponding to 24.4% conversion or a yield of 50% of the theoretical.

In addition to the examples given above, a number of other runs were made without desirable results. Some are given as controls, below, to illustrate the criticality of the process variables.

Example A.—The process of Example 1 was repeated except that for the reduction of the total pressure to 500 atm. and for making only four acrylonitrile injections of 1.33 cc. each over a 16-hour period. Gas chromatographic analysis showed a conversion to cyanocyclobutane of 1% based on acrylonitrile.

Example B.—A 30-cc. sample of 99.9+% pure acrylonitrile was placed in a constricted Carius tube, degassed on a high vacuum line by four alternate freeze-thaw cycles and sealed while evacuated. This sealed tube and about 60 mg. of 1-dodecanethiol were placed in a 80-cc. stainless steel shaker tube, freed of air as in Example 1, and ethylene added to a pressure of 100 atm. at 225° C. The sealed tube was broken by agitation of the shaker tube. After 16 hours, the tube was cooled and discharged as in Example 1. Gas chromatographic analysis showed no cyanocyclobutane had formed.

Example C.—A 20-g. sample of oxygen-free acrylonitrile was sucked into an exacuated 80-cc. stainless steel shaker tube (prepared as in Example 1) and ethylene added to give a pressure of 1000 atm. at 225° C. Reaction was carried out under these conditions for 1 hour. The tube was discharged as usual and only traces of cyanocyclobutane could be detected by gas chromatographic analysis.

Example D.—The process of Example C was repeated except that a temperature of 200° C. was used. No detectable cyanocyclobutane was formed.

Example E.—A 20-g. sample of oxygen-free acrylonitrile was added to an 80-cc. stainless steel shaker tube as in Example C and ethylene added to give a pressure of 3000 atm. at 175° C. The reaction was carried out for 8 hours. The conversions to cyanocyclobutane and to dicyanocyclobutane were both 1%.

Example F.—The process of Example E was repeated except for reaction at a temperature of 150° C. Only a trace of cyanocyclobutane and dicyanocyclobutane was formed.

The product of this invention is important in providing the starting material for a novel, low-cost route to the known compounds 1-cyanobicyclobutane and cyanocyclobutene, both of which are useful in imparting improved properties to copolymers with acrylonitrile. In general, copolymers containing 1-cyanobicyclobutane and cyanocyclobutene are tough and nonbrittle and hence useful in molded objects, in films for wrapping and packaging, and in sheet form, alone or as coating on other polymeric or glass sheet, as translucent or transparent glazing material. Protective coatings for a wide variety of substrates may be applied from melts or solutions of these copolymers. The copolymers are especially useful in fiber form for usual fiber applications.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing cyanocyclobutane which comprises reacting together ethylene and acrylonitrile with agitation for a period ranging from about one minute to 8 hours, at a temperature of about 200–350° C. and a pressure of about 500–5000 atmospheres, and at an ethylene/acrylonitrile mole ratio of about 1:1 to 100:1.

2. The process of claim 1 wherein the temperature is 250–350° C.

3. The process of claim 1 wherein the ethylene/acrylonitrile mole ratio is about 4:1 to 30:1.

4. The process of claim 1 employing an inert diluent.

5. The process of claim 1 employing additionally about 1 to 10% based on weight of acrylonitrile, of water.

6. The process of claim 1 employing a polymerization inhibitor.

7. The process of claim 6 in which the polymerization inhibitor is 1-dodecanethiol.

8. The process of claim 6 in which the polymerization inhibitor is p-methoxyphenol.

References Cited

UNITED STATES PATENTS 3,145,219   8/1964   Cripps _____ 260—464 XR

OTHER REFERENCES

Roberts: Organic Reactions, vol. 12, p. 18, John Wiley, New York (1962).

JOSEPH P. BRUST, Primary Examiner